United States Patent
Herman Saffar et al.

(10) Patent No.: US 10,824,726 B1
(45) Date of Patent: Nov. 3, 2020

(54) CONTAINER ANOMALY DETECTION USING CONTAINER PROFILES

(71) Applicant: EMC IP Holding Company LLC, Hopkinton, MA (US)

(72) Inventors: Or Herman Saffar, Beer Sheva (IL); Roie Ben Eliyahu, Yerucham (IL); Oron Golan, Meitar (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 232 days.

(21) Appl. No.: 15/940,228

(22) Filed: Mar. 29, 2018

(51) Int. Cl.
| | |
|---|---|
| *G06F 21/00* | (2013.01) |
| *G06F 21/56* | (2013.01) |
| *G06F 11/30* | (2006.01) |
| *G06F 11/32* | (2006.01) |
| *G06F 11/34* | (2006.01) |

(52) U.S. Cl.
CPC .......... *G06F 21/566* (2013.01); *G06F 11/301* (2013.01); *G06F 11/3006* (2013.01); *G06F 11/327* (2013.01); *G06F 11/3495* (2013.01); *G06F 2221/034* (2013.01)

(58) Field of Classification Search
None
See application file for complete search history.

(56) References Cited

U.S. PATENT DOCUMENTS

| 10,397,255 B1* | 8/2019 | Bhalotra | H04L 63/1416 |
| 2003/0191608 A1* | 10/2003 | Anderson | G06F 11/3447 |
| | | | 702/189 |
| 2010/0122343 A1* | 5/2010 | Ghosh | G06F 21/53 |
| | | | 726/23 |

(Continued)

OTHER PUBLICATIONS

Laguna, Ignacio et al. Automatic Problem Localization via Multi-dimensional Metric Profiling. 2013 IEEE 32nd International Symposium on Reliable Distributed Systems. https://ieeexplore.ieee.org/stamp/stamp.jsp?tp=&arnumber=6656268 (Year: 2013).*

(Continued)

*Primary Examiner* — Jeremiah L Avery
(74) *Attorney, Agent, or Firm* — Ryan, Mason & Lewis LLP

(57) ABSTRACT

Methods, apparatus and computer program products are provided for detection of anomalies in containers using corresponding container profiles. An exemplary method comprises: obtaining at least one container and a corresponding container profile from a container registry, wherein the container profile characterizes an expected normal operation of an application executing in the container; comparing a behavior of the application executing in the container to the expected normal operation in the corresponding container profile to determine if the container exhibits anomalous behavior; and providing a notification of the anomalous behavior when the container exhibits the anomalous behavior. The container profile is obtained, for example, by monitoring a behavior of (i) a plurality of (Continued)

versions of the at least one container, and/or (ii) the at least one application executing in the at least one container on a plurality of different container host devices.

20 Claims, 5 Drawing Sheets

(56) References Cited

U.S. PATENT DOCUMENTS

2016/0378577 A1* 12/2016 Russell .................. G06F 16/353 719/318
2019/0095478 A1* 3/2019 Tankersley .......... G06F 11/3006

OTHER PUBLICATIONS

Ghaith, Shadi et al. Profile-Based, Load-Independent Anomaly Detection and Analysis in Performance Regression Testing of Software Systems. 2013 17th European Conference on Software Maintenance and Reengineering. https://ieeexplore.ieee.org/stamp/stamp.jsp?tp=&arnumber=6498493 (Year: 2013).*

U.S. Appl. No. 15/797,597 entitled, "Container Life Cycle Management with Honeyspot Service", filed Oct. 30, 2017.

U.S. Appl. No. 15/797,609 entitled, "Container Life Cycle Management with Session Dilution Time", filed Oct. 30, 2017.

U.S. Appl. No. 15/797,601 entitled, Container Life Cycle Management with Retention Rate Adjustment Based on Detected Anomalies, filed Oct. 30, 2017.

U.S. Appl. No. 15/883,707 entitled, "Monitoring Containers Running on Container Host Devices for Detection for Detection of Anomalies in Current Container Behavior", filed Jan. 30, 2018.

U.S. Appl. No. 15/664,719, entitled "Method and System for Implementing Golden Container Storage", filed Jul. 31, 2017.

"Eliminate Zero-Day Cyberattacks", downloaded from https://polyverse.io/ onOct. 27, 2017.

Prometheus.IO, "Overview: What is Prometheus?," https://prometheus.io/docs/introduction/overview, Jan. 30, 2018, 4 pages.

Kubernetes.IO, "Production-Grade Container Orchestration: Automated Container Deployment, Scaling, and Management," https://kubernetes.io/, Jan. 30, 2018, 7 pages.

* cited by examiner

CONTAINER ANOMALY DETECTION USING CONTAINER PROFILES

FIELD

The field relates generally to information processing systems, and more particularly to detection of anomalies in virtual resources in information processing systems.

BACKGROUND

The static nature of existing computing systems strengthens the susceptibility of the computing systems to malicious attacks and/or unauthorized access. The United States Department of Homeland Security defines Moving Target Defense as "the concept of controlling change across multiple system dimensions in order to increase uncertainty and apparent complexity for attackers, reduce their window of opportunity and increase the costs of their probing and attack efforts." See, e.g., N. Anderson et al., "Parameterizing Moving Target Defenses," 8th IFIP Int'l Conf. on New Technologies, Mobility and Security (NTMS), 2016.

Moving Target Defense techniques aim to dynamically change the network configuration of virtual machines and containers, in order to make it harder for a malicious attacker to map the network topology.

A need exists for improved Moving Target Defense techniques.

SUMMARY

Illustrative embodiments of the present disclosure provide for detection of anomalies in one or more containers using corresponding container profiles. In one embodiment, an exemplary method comprises: obtaining at least one container and a corresponding container profile from a container registry, wherein the container profile characterizes an expected normal operation of at least one application executing in the at least one container; comparing a behavior of the at least one application executing in the at least one container to the expected normal operation in the corresponding container profile to determine if the at least one container exhibits anomalous behavior; and providing a notification of the anomalous behavior when the at least one container exhibits the anomalous behavior.

In some embodiments, the container profile is obtained by monitoring a behavior of (i) a plurality of versions of the at least one container, and/or (ii) the at least one application executing in the at least one container on a plurality of different container host devices.

Other illustrative embodiments include, without limitation, apparatus, systems, methods and computer program products comprising processor-readable storage media.

DETAILED DESCRIPTION

Figure 1:
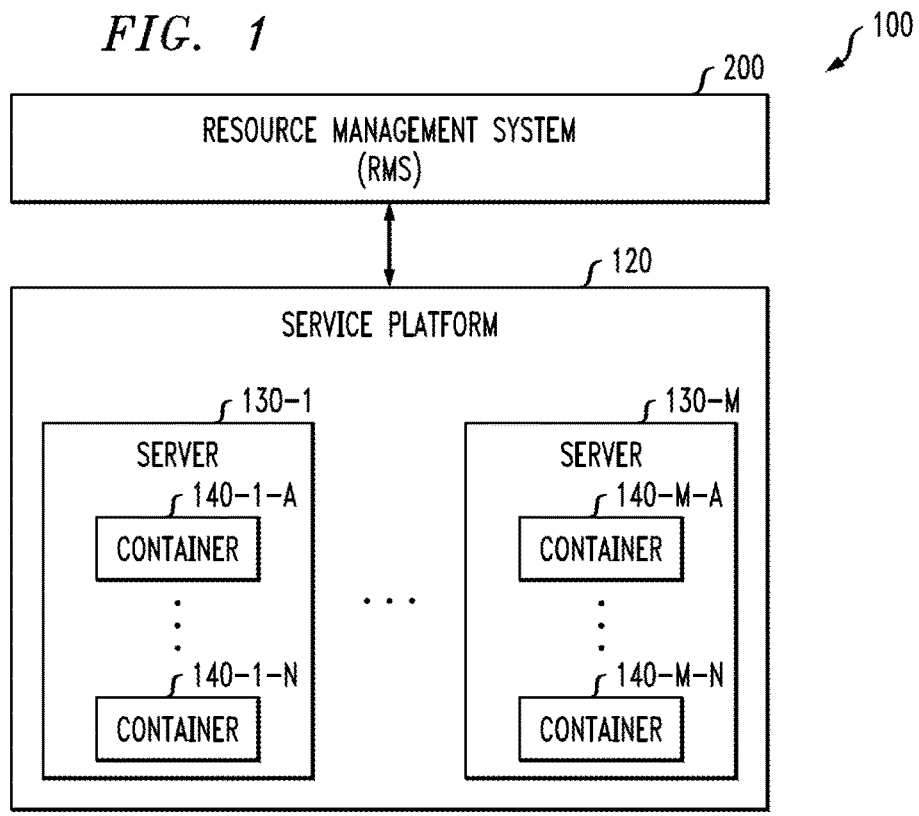
FIG. 1 illustrates an exemplary system, according to one or more embodiments of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide for anomaly detection in containers related to one or more containerized applications.

Containers provide operating system (OS)-level virtualization, in which the OS kernel allows the existence of multiple isolated user-space instances. Such instances may look like real computers from the point of view of programs or applications executing in the containers. Advantageously, containers avoid the overhead of starting and maintaining virtual machines. The container is typically composed of layers, comprising the installed components of the container, such as the OS and the packages.

A container is a lightweight, stand-alone, executable package of software that can run the software. Containers can be infected by malware, as with any OS that runs software. While the container structure has great appeal for isolating software from its surroundings, and helps reduce conflicts between different tenants or users executing different software on the same underlying infrastructure, the container structure can also be misused by malicious actors, such as malicious container developers or cyber attackers for remote code execution and security bypass. In this way, a malicious actor can not only get malware code executing in the container, but could also get the malware code within an organizational network that is connected to the container.

In some embodiments, containers are implemented as Docker containers or other types of Linux containers (LXCs). Such Docker containers and other types of LXCs may be implemented on one or more Linux processing devices using Linux kernel control groups. However, it is to be appreciated that embodiments of the present disclosure are not restricted to use with Docker containers or any other particular type of containers. Accordingly, numerous other techniques can be used in implementing containers in a given embodiment, and such techniques do not necessarily require use of the Linux control group feature. Clusters of containers can be managed across multiple container host devices using container cluster managers such as Docker Swarm® or Kubernetes®.

A container registry is a stateless, highly scalable server-side application that stores and distributes container templates (e.g., as images). The role of the container registry is to manage container templates with their versions (typically identified using tags). The most popular container registry is Docker Hub, which contains a lot of official and private repositories. An exemplary container registry is discussed further below in conjunction with FIG. 2.

New malware can be created so quickly that static defense solutions are often left behind. To detect unknown malware, there is a need for the ability to compare a new container to a corresponding container profile comprising the expected behavior of the new container, and detecting potentially harmful anomalies based on the comparison.

Unlike computers and VMs, containers are typically used to run one application. In addition, containers generally contain only the minimal required software needed by that one application. Therefore, the normal behavior of each container should correspond to normal application behavior. Different or anomalous behavior can thus more easily be distinguished in some embodiments, relative to computers or virtual machines that may run many applications concurrently.

Some embodiments provide solutions for automatically detecting anomalous behavior in new containers, by comparing the normal behavior of the containers, for example, as set forth in a corresponding container profile for the new container and applying anomaly detection techniques. Real-time detection systems described herein provide strong detection for one or more containers, and therefore can be used to protect an entire organization which uses the one or more containers.

Individuals, as well as large organizations, are using the container solution for development, testing and production. Instead of setting up development and test environments, a developer uses a prepared container downloaded from a public container registry (e.g., Docker Hub) for most of the applications. For production purposes, this method is modified for automated scaling, making it suitable for organizations, regardless of the operation system.

In one or more embodiments, the process of using a prepared container from a public registry is protected by warning a user of a security danger within the prepared container. The behavior of a specific container, for example, executing on several environments and/or used by various applications, is monitored to allow a holistic understanding of the legitimate or expected behavior of the specific container. Since a container is expected to contain only the minimal required software, a specific container executing on several environments is expected to have similar behavior, regardless of the computing device that the container is installed on or the version of the container.

U.S. patent application Ser. No. 15/883,707, filed Jan. 30, 2018, entitled "Monitoring Containers Executing On Container Host Devices For Detection Of Anomalies In Current Container Behavior," incorporated by reference herein in its entirety, describes a detection of anomalous behavior of a container, by learning its normal behavior. The disclosed anomaly detection system monitors a specific container, executing in a specific environment, and learns the expected behavior of the container during a learning period. When the prepared container is infected, however, such a learning period may not be enough to discover an anomaly.

One or more embodiments of the present disclosure evaluate a downloaded version of the container, relative to a corresponding container profile, to detect any anomalies in the downloaded container. Generally, the same type of containers, having similar versions, are expected to have a similar behavior. For example, Java container version 8.0.300 and Java container version 8.0.431 are substantially similar in their characteristics. In some embodiments, the corresponding container profile is obtained by learning the expected behavior of the container under various conditions, such as using various versions of the container and/or the container executing on various processing devices (e.g., container host devices), and then applying anomaly detection methods while the container is executing on a new processing device.

FIG. 1 illustrates an exemplary system 100, according to one or more embodiments of the disclosure. The system 100 includes a resource management system (RMS) 200 operatively connected to a service platform 120. In one embodiment of the disclosure, the RMS 200 and the service platform 120 may be directly or indirectly connected to one another through a network (e.g., a local area network (LAN), a wide area network (WAN) such as the Internet, a mobile network, or any other type of network). In embodiments where the RMS 200 and the service platform 120 are indirectly connected, there may be other networking components or systems (e.g., switches, routers, gateways, etc.) (not shown) that facilitate communication and/or information exchange. Further, the RMS 200 and the service platform 120 may communicate with one another using any combination of wired and/or wireless communication connections and/or protocols.

In at least one embodiment of the disclosure, the RMS 200 may be a platform for the centralized management and deployment of containers in the service platform 120. The RMS 200 may be implemented on a physical server (e.g., in a data center) or on a virtual server that may be cloud-based. Further, the RMS 200 may be implemented on a single server, or alternatively, on multiple servers that may be physical, virtual, or a combination thereof. In one embodiment of the disclosure, the RMS 200 may be implemented on one or more computing systems similar to the exemplary computing system shown in FIG. 9. The RMS 200 is described in further detail below with respect to FIG. 2.

In one embodiment of the disclosure, the service platform 120 may be a hardware and/or software implemented environment for the deployment of services and resources. The service platform 120 may be implemented on one or more servers 130-1 through 130-M. Each server 130 may be a physical server or a virtual server that may be cloud-based. In one embodiment of the disclosure, each server 130 may be a computing system similar to the exemplary computing system discussed further below in conjunction with FIG. 9. Further, each server 130 may be any computing system that may be programmed to receive requests, process requests, and based on the processing of requests, extend services and/or resources to client computing systems (not shown). Examples of types of servers include, but are not limited to, virtualized servers, database servers, application servers, print servers, and mail servers.

In one embodiment of the disclosure, each server 130 may be further programmed to provide computing resources to support the implementation and functionalities of a set of containers 140-1-A through 140-M-N. A container 140 may be an isolated, lightweight virtualization mechanism (or software construct) that allows for the executing of an application or an operating system within the container 140 without the overhead of executing a hypervisor (as is needed for executing virtual machines on underlying hardware). Minimal overhead may be generated by containers 140 because: (i) containers 140 share the same operating system kernel with other containers 140 and the underlying host (e.g., a server 130); and (ii) containers 140 (unlike virtual machines) do not need to emulate physical hardware. Further, in one embodiment of the disclosure, a container 140 may be implemented virtually by a host operating system.

In one embodiment of the disclosure, the set of containers 140-1-A through 140-M-N may be segmented into one or more pods (not shown). Specifically, each pod may include a subset (ss) of the set of containers 140-1-A through 140-M-N. In one embodiment of the disclosure, the aforementioned subset of containers 140-*ss* may be co-located in the same server (e.g., 130-1). In another embodiment of the disclosure, the aforementioned subset of containers 140-*ss* may be executing on multiple servers 130-1 through 130-M of the service platform 120. Furthermore, the subset of containers 140-*ss* in each pod may work together towards implementing a service. Subsequently, each container 140 in a pod may be assigned an application type, and thus, include functionalities conforming to their assigned application type. The application type that may be assigned to a container 140 may include, but is not limited to, a front-end application type, a back-end application type, and a database application type.

In one embodiment of the disclosure, a front-end (fe) application type container 140-*fe* may be representative of server computing resources dedicated towards facilitating the interaction between a service and a user, or a service and another service. Specifically, a front-end application type container 140-*fe* may include functionality to: (i) provide a specification for how the interaction and/or exchange of information should take place between the service and a user or other service; (ii) receive input (i.e., data, requests, etc.), conforming to the aforementioned specification, from a user or other service; and (iii) provide output (i.e., processed data, responses, resources, etc.), conforming to the aforementioned specification, to a user or other service. By way of example, a front-end application type container 140-*fe* may implement at least a portion of a command line interface (CLI), a graphical user interface (GUI), an application program interface (API), a web-based user interface (WUI), a natural language interface, or any combination thereof.

In one embodiment of the disclosure, a back-end (be) application type container 140-*be* may be representative of server computing resources dedicated towards implementing the functional logic and operations supporting a service. Specifically, a back-end application type container 140-*be* may include functionality to: (i) validate received input from a user or other service; (ii) maintain service-wide security operations; (iii) communicate with external hosts to retrieve additional information; and (iv) process (i.e., execute algorithms on) the received input and additional information, if any, to generate output. By way of example, a back-end application type container 140-*be* may implement at least a portion of a data processing algorithm, a validation rule, an internet security suite, a web-service (i.e., technology that allows services/applications to communicate with each other), etc.

In one embodiment of the disclosure, a database (db) application type container 140-*db* may be representative of server computer resources dedicated towards the management of information. Specifically, a database application type container 140-*db* may include functionality to: (i) track and administer information generated, stored, and/or used by the service; (ii) maintain a schema (i.e. logical structure) for the information; (iii) monitor information storage and retrieval performance; and (iv) encode information through the application of, for example, encryption, compression, deduplication, and other data transforming operations. By way of example, a database application type container 140-*db* may implement at least a portion of database management system (DBMS), an encryption, compression, deduplication, etc., algorithm, a query-response system (QRS), etc.

While containers throughout the disclosure may host applications, and thus, may be associated with application types, as described above, one of ordinary skill in the art will appreciate that containers can host other constructs without departing from the scope of the disclosure. For example, in one embodiment of the disclosure, a container 140 may alternatively host a micro-service, which may structure an application as a collection of coupled services. In another embodiment of the disclosure, a container 140 may alternatively host a web server, and thereby include functionality to store, process, and/or deliver web resources to one or more clients (not shown). In yet another embodiment of the disclosure, a container 140 may alternatively host a monitoring tool for the surveilling of, for example, web resources, servers, networks, and/or application performance and reliability.

Figure 2:
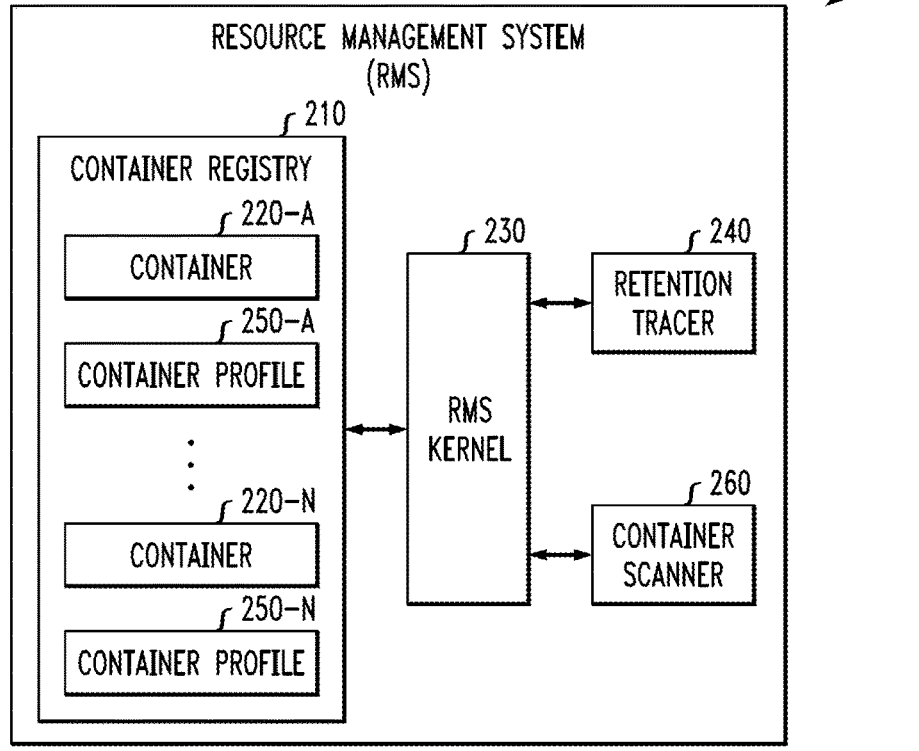
FIG. 2 illustrates the resource management system of FIG. 1, in further detail, according to an embodiment of the disclosure.

FIG. 2 illustrates the container management system 200 of FIG. 1, in further detail, according to an embodiment of the disclosure. The RMS 200 includes an RMS kernel 230 operatively connected to a container registry 210, a retention tracker 240, and a container scanner 260. Each of these components is described below.

In one embodiment of the disclosure, the RMS kernel 230 may be a core application or computer program (e.g., an operating system) executing on the underlying hardware (e.g., one or more integrated circuits) of the RMS 200. The RMS kernel 230 may include functionality to: (i) generate, store, and retrieve golden containers (described below); (ii) create containers based on a golden container of the same application type; (iii) delete or reassign containers as honeypots; (iv) generate and feed emulated network traffic to honeypot containers; (v) submit scan requests to, and receive scan responses from, the container scanner 260; and (vi) submit track requests to, and receive elapse notifications from, the retention tracker 240. One of ordinary skill in the art will appreciate that the RMS kernel 230 may include other functionalities without departing from the scope of the disclosure.

In one embodiment of the disclosure, the container registry 210 may be a secure repository for storing one or more containers 220-A through 220-N and corresponding container profiles 250-A through 250-N. The container registry 210 may be segmented into one or more logical partitions (not shown), whereby each logical partition may be reserved to store containers 220-A through 220-N, and corresponding container profiles 250-A through 250-N, for a particular service implemented on the service platform. The container registry 210 may be implemented using any type of storage unit and/or device (e.g., a file system, a database, a collection of tables, or any other storage mechanism). Further, the container registry 210 may be implemented using multiple storage units and/or devices, which may or may not be of the same type or located at the same physical site. In one embodiment of the disclosure, the container registry 210 may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other memory defined as a non-volatile Storage Class Memory (SCM).

In one embodiment of the disclosure, a container 220 may be a template for all containers of a specific application type that implement at least a portion of a service deployed through the service platform. Specifically, a container 220 may be a version (i.e., snapshot at a given time) of a cloned container belonging to a specific application type and used in the implementation of a service. Further, a container 220 may be used as a template for the generation of new containers of that specific application type towards implementing at least a portion of the service. As mentioned above, a container 220 may be associated with a front-end application type, a back-end application type, or a database application type. In one embodiment of the disclosure, a container 220 may include all the libraries, tools, and software needed to support the functionalities and/or responsibilities of a container assigned to their specific application type and towards implementing at least their portion of a service.

In one embodiment of the disclosure, the retention tracker 240 may be a computer process (or an instance of a computer program) executing on the RMS 200. Specifically, the retention tracker 240 may be a computer process dedicated towards the management of container retention times. A container retention time may refer to a duration of time (e.g., minutes, hours, etc.) specifying the lifespan of a container executing on the service platform. In one embodiment of the disclosure, the retention tracker 240 may include functionality to: (i) receive track requests from the RMS kernel 230; (ii) in response to receiving track requests, initialize and track the retention time for one or more containers actively executing on the service platform; and (iii) when a retention time for a container elapses, plus any predefined session dilution time, generate and transmit an elapse notification to the RMS kernel 230.

In one embodiment of the disclosure, the container scanner 260 may be a computer process (or an instance of a computer program) executing on the RMS 200. Specifically, the container scanner 260 may be a computer process dedicated towards the validation of containers. Validation of a container may refer to determining whether the container includes computer readable program code consistent with malicious activity, and/or whether the container exhibits anomalous behavior. Thus, in one embodiment of the disclosure, the container scanner 260 may include functionality to: (i) maintain and update a library of digital signatures (e.g., patterns of data) unique to one or more known cyber threats and/or attacks; (ii) generate container profiles 250, for example, comprising models of the intended behavior (e.g., normal operation) of one or more containers executing on the service platform; (iii) receive scan requests from the RMS kernel 230 specifying container IDs; (iv) in response to receiving scan requests, subject containers to one or more misuse and/or anomaly detection algorithms; (v) based on a matching of at least one known digital signature to at least a portion of a container, determining that the container is contaminated; (vi) based on at least one deviation from a model exhibited by an active container, determining that the container is contaminated; (vii) based on not one match to a known digital signature to at least a portion of a container and based on observing no deviations in behavior exhibited by a container with respect to a model of the container, determining that the container is clean; and (viii) generate and provide scan responses, to the RMS kernel 230, including the results of the validation process (e.g., that a container is clean, or alternatively, that a container is contaminated).

For a further discussion of containers 200 and container registries 210, see, for example, U.S. patent application Ser. No. 15/664,719, filed Jul. 31, 2017, (now U.S. Pat. No. 10,333,951), entitled "Method and System for Implementing Golden Container Storage," incorporated by reference herein in its entirety.

It is noted that container registry 210 may be implemented, at least in part, using the Docker hub container registry, from Docker, Inc. In one or more embodiments, a Kubernetes Container Orchestration Engine (COE) (see, e.g., https://kubernetes.io/) may be employed to automate deployment, scaling, and management of the containerized applications.

Figure 3:
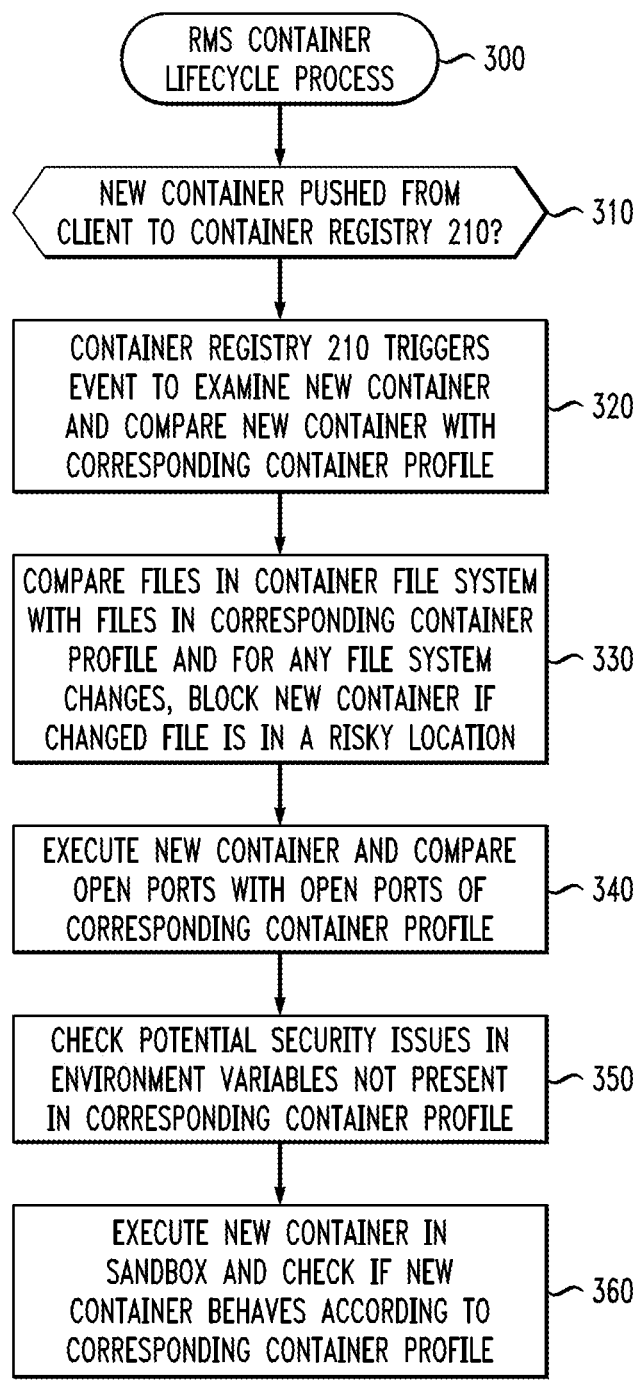
FIG. 3 is a flow chart illustrating an exemplary implementation of an RMS (Resource Management System) container life cycle process, according to one embodiment of the disclosure.

FIG. 3 is a flow chart illustrating an exemplary implementation of an RMS (Resource Management System) container life cycle process 300, according to one embodiment of the disclosure. As shown in FIG. 3, the exemplary RMS container life cycle process 300 is initiated during step 310, for example, when a new container is pushed from a client to the container registry 210 of FIG. 2.

Thereafter, the container registry 210 triggers an event to examine the new container and to compare the new container with the corresponding container profile, during step 320. The corresponding container profile may have been generated, for example, based on the expected behavior of older versions of the same container.

The RMS container life cycle process 300 then compares files in the file system of the new container with files in the corresponding container profile, during step 330. For any detected file system changes, the new container is blocked, if the changed file is in a predefined risk location, such as an OS file system.

The new container is then executed during step 340, for example, in a sandbox environment, and ports opened by the new container are compared with open ports in the corresponding container profile. The exemplary RMS container life cycle process 300 then checks for potential security issues in environment variables (e.g., users and passwords) during step 350 that are not present in the corresponding container profile.

Finally, the exemplary RMS container life cycle process 300 executes the new container, for example, in a sandbox, and checks if the new container behaves according to the corresponding container profile, for example, with respect to one or more container metrics, such as process type, location of logs, central processing units (CPUs) usage, and average memory usage during step 360.

In some embodiments, a CPU usage metric comprises one or more of a number of elapsed enforcement period intervals; a number of throttled period intervals; a total time duration the container has been throttled; a cumulative system CPU time (e.g., consumed in seconds); a cumulative CPU time consumed per CPU (e.g., in seconds); and a cumulative user CPU time consumed in seconds.

In one or more embodiments, a Memory usage metric comprises one or more of a number of bytes of page cache memory, a number of memory usage hit limits; a cumulative count of memory allocation failures; a size of RSS (Rich Site Summary) in bytes; a container swap usage in bytes; a current memory usage in bytes; and a current working set in bytes.

In at least one embodiment, a File System metric comprises one or more of a number of available Modes; a number of Modes; a number of I/Os (input/output operations) currently in progress; a cumulative count of seconds spent doing I/Os; a cumulative weighted I/O time (e.g., in seconds); a number of bytes that can be consumed by the container on this filesystem; a cumulative count of seconds spent reading/writing; a cumulative count of bytes read/written; a cumulative count of reads/writes merged; a cumulative count of reads/writes completed; a cumulative count of sector reads completed; a cumulative count of sector writes completed; and a number of bytes that are consumed by the container on this filesystem.

In one exemplary embodiment, a Networking usage metric comprises one or more of a cumulative count of bytes received; a cumulative count of errors encountered while receiving; a cumulative count of packets dropped while receiving; a cumulative count of packets received; a cumulative count of bytes transmitted; a cumulative count of errors encountered while transmitting; a cumulative count of packets dropped while transmitting; and a cumulative count of packets transmitted.

In some embodiments, a System Calls usage metric comprises one or more of a sequence of assembly commands (this metric is typically limited to the containers domain).

In other embodiments, the container metrics comprise a System Calls metric that can be used for anomalous container behavior detection. The system calls are the base blocks of each process in the operating system. Therefore, monitoring system calls necessarily recognizes actions on the system. Since a container is a process (that simulates an independent operating system), the entire container system can be monitored by tracking the system calls of a single process.

In some embodiments, the system calls metric is obtained by collecting the system assembly commands, grouping them using an N-Grams method (for example, 4-Grams), and counting their frequency. The anomaly detection system will learn the normal system calls groups, and unfamiliar system calls group will be considered an anomaly. Known system calls will be grouped and counted, and examined by a distance from the normal frequency.

In another embodiment, the container metrics comprise an Open Ports metric. As noted above, a container unit should typically only be used to run one application, and the ports used by this application are the same, regardless of the container host device where the container is executing. The usual open ports are monitored for one application, which will a warning when another port is used.

Figure 4:
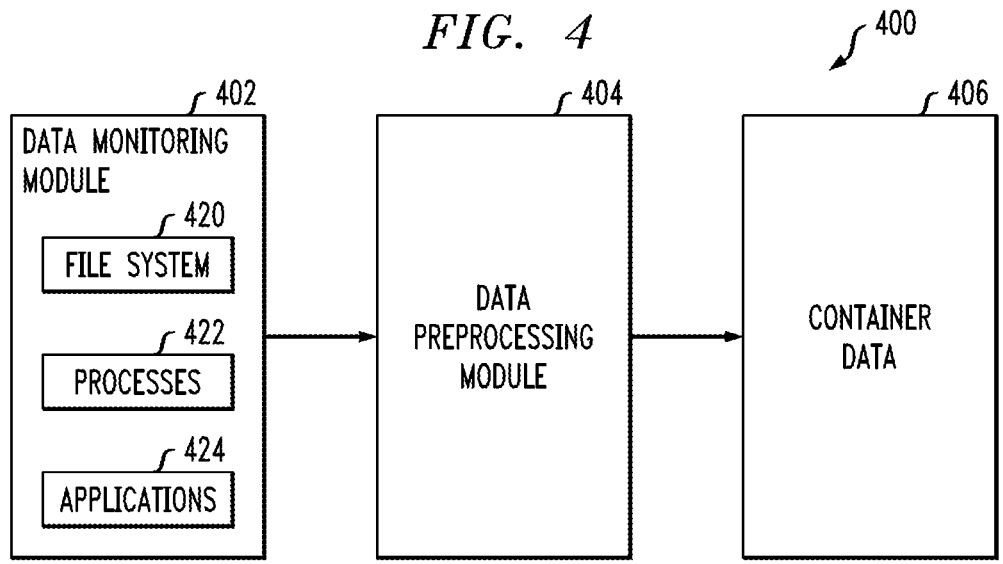
FIG. 4 is a block diagram of container monitoring, according to an illustrative embodiment.

FIG. 4 is a block diagram for container monitoring 400, according to an illustrative embodiment. Container monitoring includes data monitoring module 402, which monitors different sectors of containers, such as file systems 420 (e.g., to determine files that have been changed, deleted, added, etc.), processes 422 (e.g., executing processes in a container) and applications 424 (e.g., information gathered using monitoring tools). One example of a monitoring tool which may be used to gather information from applications executing on containers is the Prometheus® monitoring tool. Prometheus® is an open source monitoring tool for monitoring applications in clusters, such as clusters of the container orchestrator Kubernetes®. Raw data that is collected from the different sources 420, 422 and 424 by the data monitoring module 402 is preprocessed in the data preprocessing module 404, so as to obtain various behavior metrics for a container. The preprocessed data from the data preprocessing module 404 is provided as container data 406. The preprocessing of the data by the data preprocessing module 404 may prepare the raw data for, for example, an anomaly detection system, as discussed further below in conjunction with FIG. 5. The container data 406 may be used in a machine learning network to detect more general anomaly behavior. The machine learning network may rely on statistics or behavior metrics in the container data 406 including, but not limited to, one or more container metrics, such as CPU and memory utilization, input/output (IO) and network usage, as described above.

Figure 5:
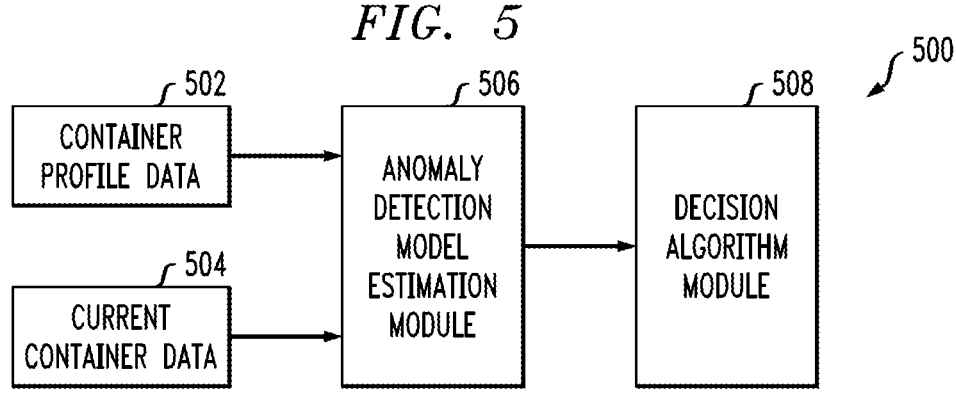
FIG. 5 is a block diagram of anomalous container behavior detection, according to one embodiment.

FIG. 5 is a block diagram for anomalous container behavior detection 500, according to one embodiment. In some embodiments, container data 406 (FIG. 4) may be separated into container profile data 502 and current container data 504. As discussed herein, the container profile data 502 includes information that is obtained during a period where one or more similar containers (e.g., prior versions of the same container) are assumed to be operating normally. In some embodiments, the container profile data 502 is obtained from a container behavior database. The container profile data 502 is not obtained from the same container as the current container data 504. For example, in some embodiments, the container profile data 502 is obtained from an entity which runs applications in prior versions of the containers under controlled conditions so as to obtain "normal" behavior data for a container that runs a particular application or applications.

Using the baseline behavior of a container using the container profile data 502, the anomaly detection model estimation module 506 applies anomaly detection techniques over various metrics to the new or current container data 504. Anomaly detection techniques which may be utilized by the anomaly detection model estimation module 506 include but are not limited to time-series outlier detection, k-nearest neighbor and recurrent neural networks, etc.

After model estimation, the decision algorithm module 508 applies a decision making algorithm to find anomalous behavior in the current container data 504. On detecting anomalous behavior, an alert generation module can generate an alert or other notification for delivery to a security response team or other authorized personnel (e.g., such as by delivering the alert via one or more application programming interfaces (APIs) to security or host agents executing on one or more client devices). The decision making algorithm may be different for each container behavior metric, and may consider all container behavior metrics which are available to make a final decision about current container behavior. In some embodiments, the decision making algorithm is composed of a series of threshold decisions for specific container behavior metrics (e.g., where different thresholds may be used for different container behavior metrics), with more complex decisions based on the entirety of the current container behavior data 504 and the anomaly detection model generated by the anomaly detection model estimation module 506. Thus, in some embodiments the anomaly detection model estimation and decision making algorithm processes in modules 506 and 508 are interdependent and inseparable, with the combination of such processes being used to make determinations about the current container behavior.

As mentioned above, containers, unlike computers and VMs, are generally used to run only one application. Thus, the normal behavior of a container corresponds to normal application behavior, and different or anomalous application behavior can be distinguished. The ability to distinguish between normal and suspicious behavior can increase with the use of a moving target defense (MTD) approach. In the MTD approach, container behavior for a given application is monitored using corresponding container profiles 250 and/or as learned during a learning period, which may extend for a number of lifecycles. The length of a lifecycle may be user defined, and is generally short in duration (e.g., ranging from a few seconds to a few minutes). Consider, for example, a lifecycle of 30 seconds and a learning period which extends for 10 lifecycles, or 300 seconds. After the learning period, a container executing the given application is started and run for each lifecycle. At the end of each lifecycle, a new container executing the given application is started. The container behavior in each lifecycle is compared to the corresponding container profile 250 (FIG. 2). The MTD approach provides various advantages. Because the lifetime or lifecycle is not long (e.g., lifecycles in the range of a few seconds to a few minutes), the behavior of the container in each lifecycle should generally be as similar as possible to the container behavior in the learning period. Thus, anomaly detection is simplified. Further, real-time or near real-time (e.g., on the order of the lifecycle of the container) detection of anomalies and container cyber-attacks is provided.

Additional details regarding MTD approaches may be found in U.S. patent application Ser. No. 15/797,609, filed Oct. 30, 2017 and titled "Container Life Cycle Management with Session Dilution Time," and U.S. patent application Ser. No. 15/797,597, filed Oct. 30, 2017 and titled "Container Life Cycle Management with Honeypot Service," and U.S. patent application Ser. No. 15/797,601, filed Oct. 30, 2017 and titled "Container Life Cycle Management with Retention Rate Adjustment Based on Detected Anomalies," the disclosures of which are incorporated by reference herein in their entirety.

Using techniques described herein, embodiments are able to detect container cyber-attacks in real-time (e.g., for detecting zero-day attacks on containers), such as during an attempt to penetrate an organization or other enterprise. Preventive processes or remedial action may be performed manually or automatically in response to generated alerts indicating detection of anomalous container behavior. In addition, embodiments are able to detect anomalous behavior even if the attacker uses only passive activities, as such passive activities may diverge from normal or learned container behavior.

A particular example of container file system anomaly detection will now be described using one possible container behavior metric and associated anomaly detection method. A Jetty® web server executing in a container writes log files to the container file system. The log files name format is known, and should be similar for each log file. A list of legitimate file names may be provided in the corresponding container profile 250. Comparing new file names written to the container file system with the legitimate file names in the corresponding container profile 250 produces a difference measure indicating the difference between such files, permitting determination of the validity of new files written to the container file system. The difference between file names may be measured using, for example, a Levenshtein distance.

Figure 6:
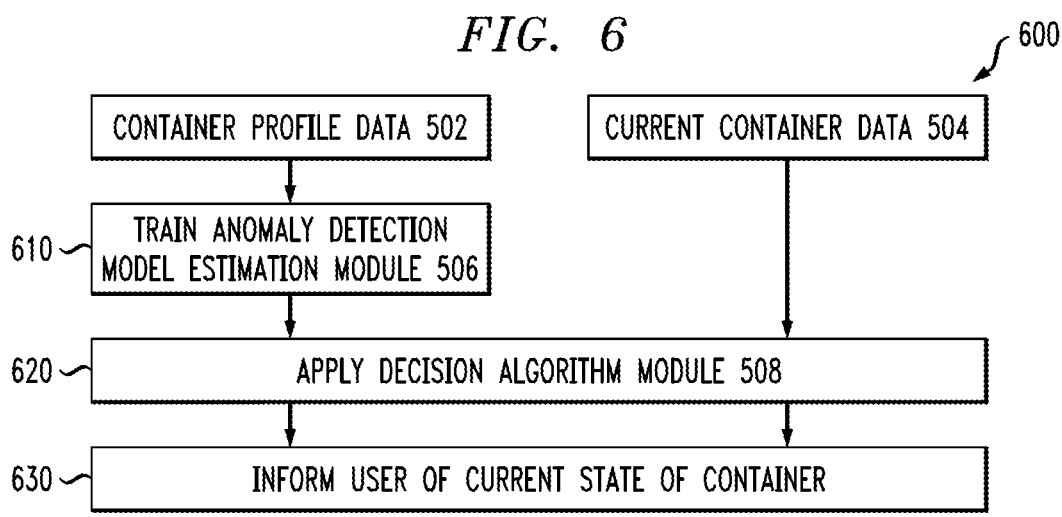
FIG. 6 is a flow chart illustrating an exemplary implementation of a container monitoring process, according to one embodiment of the disclosure.

FIG. 6 is a flow chart illustrating an exemplary implementation of a container monitoring process 600, according to one embodiment of the disclosure. As shown in FIG. 6, the exemplary container monitoring process 600 initially trains the anomaly detection model estimation module 506 (FIG. 5) during step 610, using the container profile data 502.

Once the container representations are prepared in the training step, the anomaly detection algorithm is applied to the decision algorithm module 508 is applied to the trained anomaly detection model estimation module 506 and the current container data 504 during step 620, to determine whether the behavior of the container is legitimate or not, based on the prior observations of normal behavior of legitimate containers, and thereby detect any anomalies in the container.

The decision about the current state during step 620 is based on the insights from the anomaly detection algorithm. If the current behavior is not similar to the previous normal behaviors, as set forth in the corresponding container profile 250, the user will receive an alert during step 630 regarding the state of the container. For example, a notification of the anomalous behavior can comprise one or more of (i) requesting a user to specify a next action, (ii) implementing a predefined user policy, and (iii) suspending further execution of the at least one container.

Consider, for example, a Java version 8 container that is downloaded from a container registry and that is modified by an attacker. It is known that an OS of a Java version 8 container will open certain ports five minutes after starting.

The attacker attempted to push its version of the Java version 8 container to the container registry, which triggers a vulnerability scan, such as a Clair/Xray scan, which does not find any layer in the container with a problem and the push succeeds. Thereafter another client of the container registry pulls the new version of the Java container, and uses the container to build their application.

To find attacks, they use a usual machine learning process and the container starts to run during a learning period. In that time, some ports were opened, and the machine learning process marks that behavior as normal. Even after the learning period, the machine learning will not raise an alert if any unusual ports are opened, as long as they were opened during the learning period. On the other hand, using the disclosed container anomaly detection techniques, the suspicious behavior (e.g., opening any ports other than the ports specified in the corresponding container profile 250) will be recognized, since this type of container, under normal behavior, does not use such ports. The user will receive an alert about the anomalous behavior, since the disclosed anomaly detection system learned normal behavior from prior Java container versions on various container host types. Therefore, the disclosed anomaly detection system can recognize that these new ports should not be in use for a Java container.

In some embodiments, the disclosed anomaly detection techniques allow anomalies to be detected upon an initial download of a new container.

Among other benefits, the disclosed anomaly detection techniques can detect an anomaly even without monitoring the new container during a learning period.

One or more embodiments of the disclosure provide improved methods, apparatus and computer program products for anomaly detection in containers related to one or more containerized applications. The foregoing applications and associated embodiments should be considered as illustrative only, and numerous other embodiments can be configured using the techniques disclosed herein, in a wide variety of different applications.

It should also be understood that the disclosed anomaly detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for detecting anomalies may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications executing on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as an anomaly detection model estimation module 506, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of an anomaly detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 through 9. These platforms may also be used to implement at least portions of other information processing systems in other embodiments.

Figure 7:
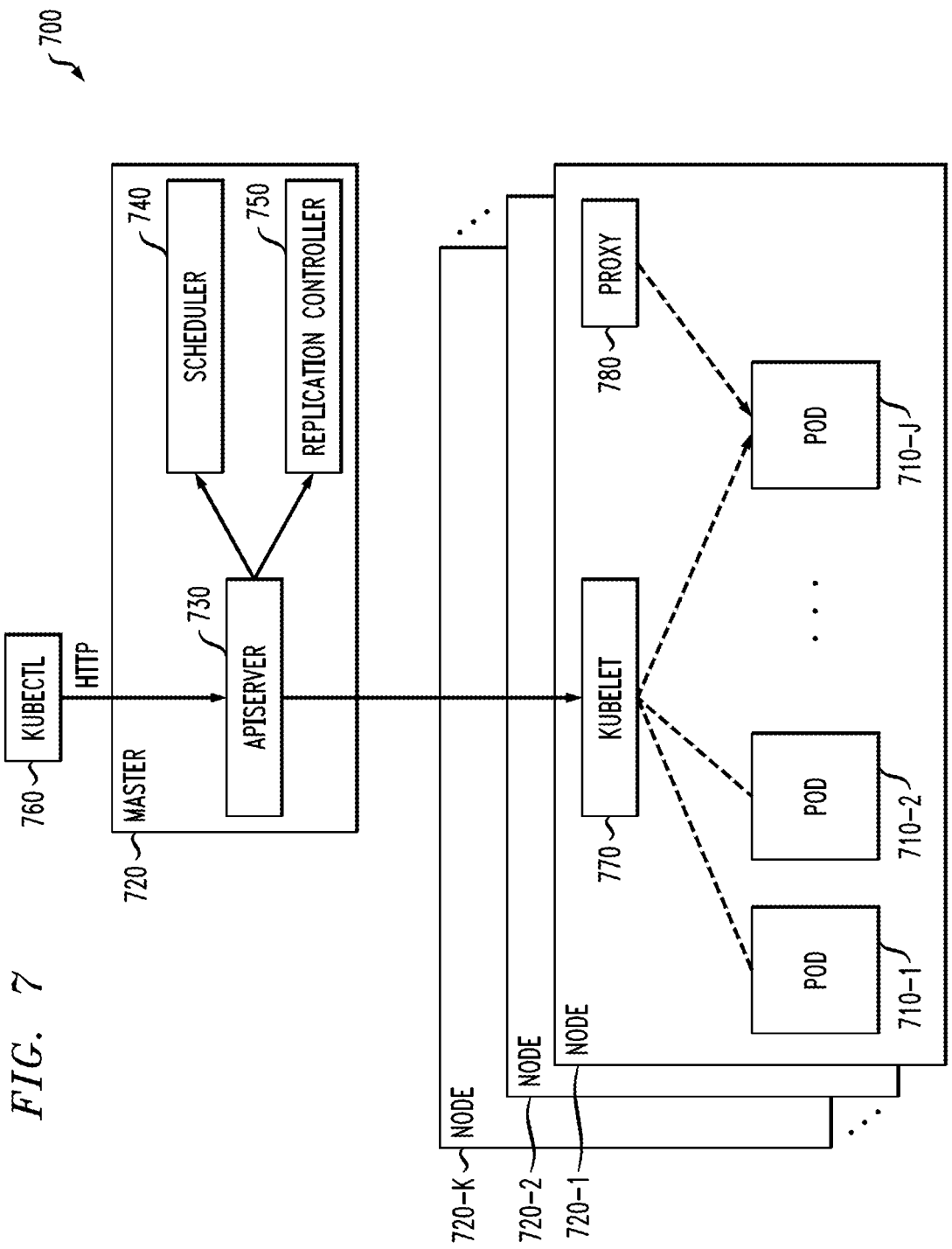
FIG. 7 illustrates an exemplary Kubernetes processing platform that may be used to implement at least a portion of one or more embodiments of the disclosure comprising a cloud infrastructure.

FIG. 7 illustrates an exemplary Kubernetes processing platform 700 that may be used to implement at least a portion of one or more embodiments of the disclosure comprising a containerized infrastructure. Generally, Kubernetes is an open-source system for automated deployment, scaling and management of containerized applications across clusters of hosts. Kubernetes supports a number of container tools, including Docker.

As shown in FIG. 7, the exemplary Kubernetes processing platform 700 typically deploys and schedules containers in groups referred to as pods 710-1 through 710-J. An exemplary Kubernetes pod 710 will typically include one to two containers that collaborate to provide a service, in a known manner. The pods 710 may optionally execute on a plurality of nodes 720-1 through 720-K.

Each node 720 further comprises a kubelet 770 that serves as a primary "node agent" executing on each node 720. The kubelet 770 works in terms of a PodSpec. A PodSpec is a YAML or JSON (JavaScript Object Notation) object that describes a pod. YAML is a human-readable data serialization language that is often used for a configuration file. In one or more embodiments, the kubelet 770 takes a set of PodSpecs that are provided through various mechanisms (primarily through the apiserver 730, discussed below) and ensures that the containers described in those PodSpecs are executing and healthy. The kubelet 770 does not manage containers that were not created by Kubernetes.

As shown in FIG. 7, a Kubernetes network proxy 780 also runs on each node 720. The Kubernetes network proxy 780 reflects services as defined in the Kubernetes API on each node and can do TCP (Transmission Control Protocol), UDP (User Datagram Protocol) stream forwarding or round robin TCP, UDP forwarding across a set of backends. The user creates a service with the API of the apiserver 730 to configure the proxy 780.

In addition, Kubernetes defines a master node 720—Master. As shown in FIG. 7, the master node 720—Master comprises a Kubernetes scheduler 740, a Kubernetes API server (apiserver) 730 and one or more replication controllers 750. Generally, the Kubernetes API server (apiserver) 730 validates and configures data for the API objects that include pods 710, services, replication controllers, and others. The API Server services Representational State Transfer (REST) operations and provides the frontend to the cluster's shared state through which all other components interact.

The Kubernetes scheduler 740 is a topology-aware, workload-specific function that impacts availability, performance, and capacity. The scheduler 740 considers individual and collective resource requirements, quality of service requirements, hardware/software/policy constraints, affinity and anti-affinity specifications, data locality, inter-workload interference and/or deadlines. Workload-specific requirements are optionally exposed through the API, as necessary.

The replication controller 750 instantiates the pods 710. The replication controller 750 controls and monitors the number of executing pods 710 for a service, improving fault tolerance. The exemplary Kubernetes processing platform 700 further employs a kubectl interface 760, serving as a command line interface for executing commands against Kubernetes clusters, in a known manner.

In one or more embodiments, the exemplary Kubernetes processing platform 700 employs a flat network model and permits all pods 710 to communicate with each other. Containers in the same pod 710 share an IP address and can communicate using ports on the localhost address. In addition, services are endpoints that can be addressed by name and can be connected to pods 710 using label selectors. The service will automatically distribute requests between the pods 710 in a round robin manner. Kubernetes sets up a DNS server for the cluster that watches for new services and allows new services to be addressed by name.

Figure 8:
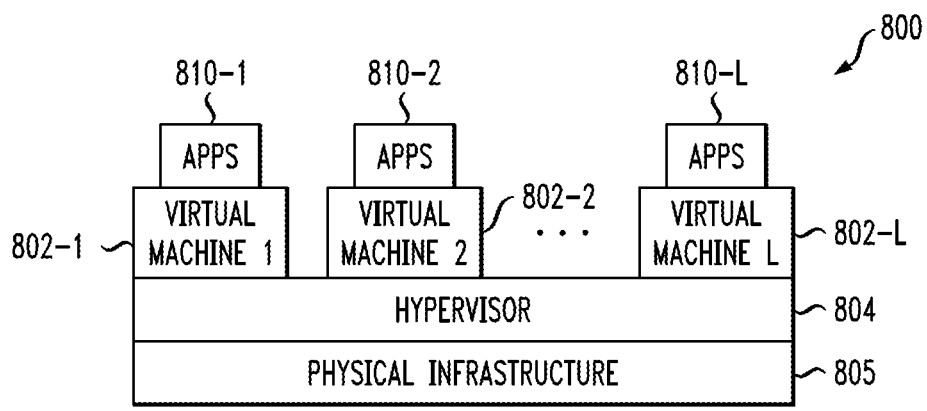
FIG. 8 illustrates an exemplary processing platform that may be used to implement at least a portion of one or more embodiments of the disclosure comprising a cloud infrastructure.

Referring now to FIG. 8, one possible processing platform that may be used to implement at least a portion of one or more embodiments of the disclosure comprises cloud infrastructure 800. The cloud infrastructure 800 in this exemplary processing platform comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L executing on respective ones of the virtual machines 802-1, 802-2, . . . 802-L under the control of the hypervisor 804.

The cloud infrastructure 800 may encompass the entire given system or only portions of that given system, such as one or more of client, servers, controllers, or computing devices in the system.

Although only a single hypervisor 804 is shown in the embodiment of FIG. 8, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 804 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the disclosed anomaly detection engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed container anomaly detection apparatus may each run on a computer, server, storage device or other processing platform element. A given such element may be viewed as an example of what is more generally referred to herein as a "processing device." The cloud infrastructure 800 shown in FIG. 8 may represent at least a portion of one processing platform.

Figure 9:
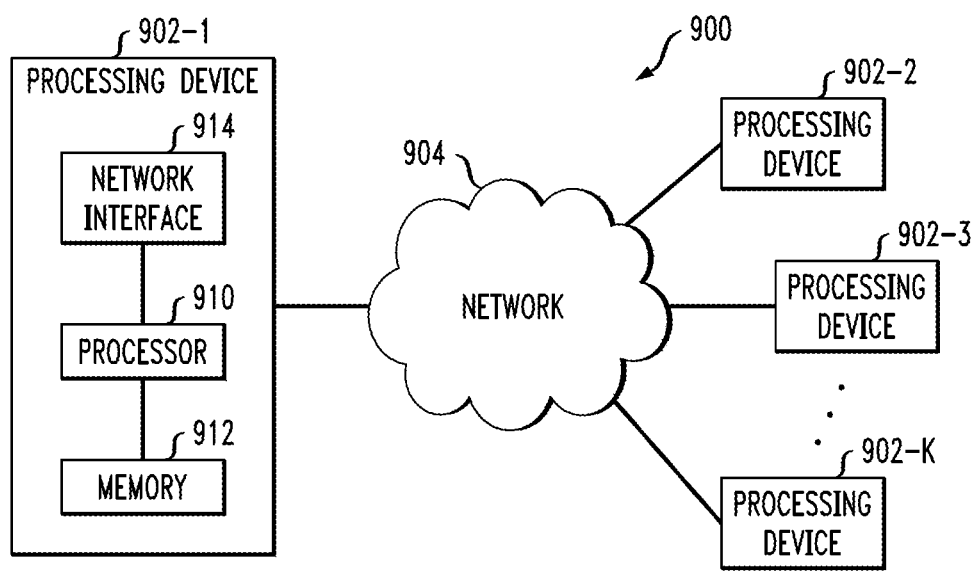
FIG. 9 illustrates another exemplary processing platform that may be used to implement at least a portion of one or more embodiments of the disclosure.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 3 and 6 are illustratively implemented in the form of software executing on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining at least one container and a corresponding container profile from a container registry, wherein the container profile characterizes an expected normal operation of at least one application executing in the at least one container and at least one metric indicating a resource usage of one or more of: (i) one or more processing resources, (ii) one or more memory resources, and (iii) one or more networking resources, wherein the at least one metric indicates resources expected to be employed by the at least one application executing in the at least one container during the expected normal operation;
comparing, using at least one processing device, a behavior of the at least one application executing in the at least one container to the expected normal operation in the corresponding container profile to determine if the at least one container exhibits anomalous behavior; and
providing, using said at least one processing device, a notification of the anomalous behavior when the at least one container exhibits the anomalous behavior.

2. The method of claim 1, wherein the container profile is obtained by monitoring a behavior of one or more of (i) a plurality of versions of the at least one container, and (ii) the at least one application executing in the at least one container on a plurality of different container host devices.

3. The method of claim 1, wherein the container profile characterizes one or more of system calls and ports expected to be employed by the at least one application executing in the at least one container during normal operation.

4. The method of claim 1, wherein the container profile further characterizes file system metrics expected to be employed by the at least one application executing in the at least one container during normal operation.

5. The method of claim 1, wherein the container profile characterizes one or more environment variables expected to be employed by the at least one application executing in the at least one container during normal operation.

6. The method of claim 1, wherein the step of providing a notification of the anomalous behavior further comprises one or more steps of requesting a user to specify a next action, implementing a predefined user policy, and suspending further execution of the at least one container.

7. The method of claim 1, wherein the comparing step is performed in response to the obtaining of the at least one container from the container registry.

8. The method of claim 1, wherein a learning period of the at least one container extends for a predetermined number of lifecycles of the at least one container.

9. A system, comprising:
a memory; and
at least one processing device, coupled to the memory, operative to implement the following steps:
obtaining at least one container and a corresponding container profile from a container registry, wherein the container profile characterizes an expected normal operation of at least one application executing in the at least one container and at least one metric indicating a resource usage of one or more of: (i) one or more processing resources, (ii) one or more memory resources, and (iii) one or more networking resources, wherein the at least one metric indicates resources expected to be employed by the at least one application executing in the at least one container during the expected normal operation;
comparing, using at least one processing device, a behavior of the at least one application executing in the at least one container to the expected normal operation in the corresponding container profile to determine if the at least one container exhibits anomalous behavior; and
providing, using said at least one processing device, a notification of the anomalous behavior when the at least one container exhibits the anomalous behavior.

10. The system of claim 9, wherein the container profile is obtained by monitoring a behavior of one or more of (i) a plurality of versions of the at least one container, and (ii) the at least one application executing in the at least one container on a plurality of different container host devices.

11. The system of claim 9, wherein the container profile characterizes one or more of system calls and ports expected to be employed by the at least one application executing in the at least one container during normal operation.

12. The system of claim 9, wherein the container profile further characterizes file system metrics expected to be employed by the at least one application executing in the at least one container during normal operation.

13. The system of claim 9, wherein the container profile characterizes one or more environment variables expected to be employed by the at least one application executing in the at least one container during normal operation.

14. The system of claim 9, wherein the step of providing a notification of the anomalous behavior further comprises one or more steps of requesting a user to specify a next action, implementing a predefined user policy, and suspending further execution of the at least one container.

15. The system of claim 9, wherein the comparing step is performed in response to the obtaining of the at least one container from the container registry.

16. A computer program product, comprising a non-transitory machine-readable storage medium having encoded therein executable code of one or more software programs, wherein the one or more software programs when executed by at least one processing device perform the following steps:

obtaining at least one container and a corresponding container profile from a container registry, wherein the container profile characterizes an expected normal operation of at least one application executing in the at least one container and at least one metric indicating a resource usage of one or more of: (i) one or more processing resources, (ii) one or more memory resources, and (iii) one or more networking resources, wherein the at least one metric indicates resources expected to be employed by the at least one application executing in the at least one container during the expected normal operation;

comparing, using at least one processing device, a behavior of the at least one application executing in the at least one container to the expected normal operation in the corresponding container profile to determine if the at least one container exhibits anomalous behavior; and providing, using said at least one processing device, a notification of the anomalous behavior when the at least one container exhibits the anomalous behavior.

17. The computer program product of claim 16, wherein the container profile is obtained by monitoring a behavior of one or more of (i) a plurality of versions of the at least one container, and (ii) the at least one application executing in the at least one container on a plurality of different container host devices.

18. The computer program product of claim 16, wherein the container profile characterizes one or more of system calls and ports expected to be employed by the at least one application executing in the at least one container during normal operation.

19. The computer program product of claim 16, wherein the step of providing a notification of the anomalous behavior further comprises one or more steps of requesting a user to specify a next action, implementing a predefined user policy, and suspending further execution of the at least one container.

20. The computer program product of claim 16, wherein the comparing step is performed in response to the obtaining of the at least one container from the container registry.

* * * * *